United States Patent
Bray et al.

(10) Patent No.: US 10,632,563 B2
(45) Date of Patent: *Apr. 28, 2020

(54) ROTARY FRICTION WELDING

(71) Applicant: ROLLS-ROYCE plc, London (GB)

(72) Inventors: Simon E. Bray, Derby (GB); Andrew R. Walpole, Derby (GB)

(73) Assignee: ROLLS-ROYCE PLC, London (GB)

( * ) Notice: Subject to any disclaimer, the term of this patent is extended or adjusted under 35 U.S.C. 154(b) by 337 days.

This patent is subject to a terminal disclaimer.

(21) Appl. No.: 15/654,048

(22) Filed: Jul. 19, 2017

(65) Prior Publication Data
US 2018/0029158 A1 Feb. 1, 2018

(30) Foreign Application Priority Data
Jul. 26, 2016 (GB) .................................. 1612912.4

(51) Int. Cl.
*B23K 20/00* (2006.01)
*B23K 20/12* (2006.01)
*B23K 33/00* (2006.01)
*B23K 101/00* (2006.01)

(52) U.S. Cl.
CPC ............ *B23K 20/129* (2013.01); *B23K 20/12* (2013.01); *B23K 33/006* (2013.01); *B23K 2101/001* (2018.08)

(58) Field of Classification Search
CPC . B23K 20/129; B23K 2101/001; B23K 20/12
See application file for complete search history.

(56) References Cited

U.S. PATENT DOCUMENTS

| | | | | |
|---|---|---|---|---|
| 8,480,368 B2 * | 7/2013 | Tolbert | ...................... | B21J 5/00 |
| | | | | 416/213 R |
| 8,631,573 B2 * | 1/2014 | Scharp | .................... | B23P 15/10 |
| | | | | 29/888.04 |
| 8,918,996 B2 * | 12/2014 | Wessman | ........... | B23K 35/3033 |
| | | | | 148/564 |

(Continued)

FOREIGN PATENT DOCUMENTS

| | | |
|---|---|---|
| EP | 2168707 | 3/2010 |
| EP | 2987583 | 2/2016 |
| WO | 2014152842 | 9/2014 |

OTHER PUBLICATIONS

European Search Report dated Jan. 29, 2018, issued in EP Patent Application No. 17179914.

(Continued)

*Primary Examiner* — Erin B Saad
(74) *Attorney, Agent, or Firm* — Oliff PLC

(57) ABSTRACT

A rotary friction welding process is provided, including: providing a first axisymmetric workpiece having a first annular weld surface, and a second axisymmetric workpiece having a second annular weld surface; and rotationally welding the workpeices. On the longitudinal section through the aligned workpieces, each of the first and second annular weld surfaces is flanked by radially inner and outer side surfaces, the first weld surface and its side surfaces being shaped to thermally match the second weld surface and its side surfaces across a line of initial contact of the first and second weld surfaces such the heat flows from the weld at all the side surfaces are substantially equal.

15 Claims, 6 Drawing Sheets

(56) References Cited

U.S. PATENT DOCUMENTS

2008/0120842 A1* 5/2008 Wines ................... B23P 15/006
                                                    29/889.21
2008/0220820 A1* 9/2008 Foxenland .......... H04W 52/027
                                                    455/566
2009/0220820 A1   9/2009 Kolbe et al.
2011/0206523 A1* 8/2011 Konitzer ............ B23K 20/1205
                                                    416/213 R

OTHER PUBLICATIONS

Great Britain Search Report dated Feb. 13, 2017, issued in GB Patent Application No. 1612912.4.

* cited by examiner

At contact

At upset to bases of projections

At upset beyond projections to edges of adjacent additional surfaces

At upset beyond adjacent additional surfaces

ROTARY FRICTION WELDING

CROSS-REFERENCE TO RELATED APPLICATIONS

This specification is based upon and claims the benefit of priority from UK Patent Application Number 1612912.4 filed on Jul. 26, 2016, the entire contents of which are incorporated herein by reference.

BACKGROUND

1. Field of the Disclosure The present disclosure relates to a rotary friction welding process.

2. Description of the Related Art

Rotary friction welding is the process for welding together two bodies or workpieces by converting mechanical energy to heat energy by the friction between the engaging weld surfaces of the two workpieces. The process involves effecting relative rotation between the two workpieces while the weld surfaces remain in engagement with each other.

For example, in inertia friction welding one of two coaxial workpieces is attached to a flywheel, rotated to a predetermined speed and then driven against the second workpiece using thrust supplied by the welding machine. A fixed amount of stored energy in the flywheel (proportional to $rpm^2.I$, where rpm is the flywheel's predetermined speed and I is its rotational inertia) is thereby converted to heat by friction at the interface of the engaging weld surfaces, which bonds the workpieces together.

The initial contact between the weld surfaces produces a conditioning period in which friction raises the temperature at the interface. This is followed by upsetting when the temperature reaches a high enough level such that softening/melting of the workpiece material allows the workpieces to be pushed together, with material being expelled sideways from a plasticised zone at the interface as flash.

In its application to turbine hardware, such as the joining of compressor discs, the weld geometry is tubular, i.e. axisymmetric. When using rotary friction to join two discs together to form a welded drum, it is standard practice for the rotating axis of the discs and the direction of applied welding thrust to be parallel, and for the starting weld surfaces of the discs to be flat end faces perpendicular to the rotating axis.

It would be desirable to be able produce a rotary friction weld in which the weld interface is not perpendicular to the rotating axis. This would then allow, for example, a turbine machinery rotor disc to be formed by joining a rim of the disc to a diaphragm of the disc.

However, an inclined weld interface can produce a biased outflow of expelled material from the interfacial plasticised zone, leading to substantial rotation of the weld interface. The biased outflow can prevent effective cleaning of the interface, and thus can negatively impact on weld integrity.

SUMMARY

To address such issues, in a first aspect the present disclosure provides a rotary friction welding process including:

providing a first axisymmetric workpiece having a first annular weld surface, and a second axisymmetric workpiece having a second annular weld surface, aligning the workpieces on a common axis with the weld surfaces facing each other, rotating one workpiece about the axis relative to the other workpiece, and engaging the workpieces at the first and second weld surfaces such that the rotation raises the temperature at the weld surfaces to create a weld interface, and ceasing the rotation and allowing the weld interface to cool to weld the workpieces together at the interface; wherein:

the first annular weld surface is at a radially inward extent of the first workpiece, and the second annular weld surface is at a radially outward extent of the second workpiece, on a longitudinal section through the aligned workpieces, the first and second annular weld surfaces are inclined from the radial direction and are substantially parallel to each other such that the cooled weld interface is correspondingly inclined from the radial direction, and on the longitudinal section through the aligned workpieces, each of the first and second annular weld surfaces is flanked by radially inner and outer side surfaces which are angled from their respective weld surface, the first weld surface and its side surfaces being shaped to thermally match the second weld surface and its side surfaces across a line of initial contact of the first and second weld surfaces such the heat flows from the weld at all the side surfaces are substantially equal.

Advantageously, by thermally matching the weld and side surfaces across the line of initial contact, a similar heat-sink effect can be produced in each workpiece. This in turn allows the outward flow of expelled material from the weld to be controlled, reducing flow bias and helping to control rotation of the weld interface.

On the longitudinal section through the aligned workpieces, the first weld surface and its side surfaces may mirror the second weld surface and its side surfaces across the line of initial contact of the first and second weld surfaces. This arrangement can provide good thermal matching particularly when the materials of the first and second workpieces are the same or have similar thermal properties, and/or when the first and second annular weld surfaces are inclined by 45° from the radial direction.

The thermal matching across the line of initial contact typically involves using the specific heat capacity and/or thermal conductivity of each of the first and second workpieces to determine appropriate shapes for the weld surfaces and their side surfaces such that the heat flows from the weld are substantially equal.

Each of the first and second annular weld surfaces may be an apex region of a convexity which is consumed as the workpieces are engaged, on the longitudinal section through the aligned workpieces each convexity having a profile in which the radially inner and outer side surfaces taper towards the apex region such that, on the longitudinal section, the weld interface increases in length as the convexities are consumed. Each convexity can be a projection from the respective workpiece.

Indeed, in a second aspect the present disclosure provides a rotary friction welding process including:

providing a first axisymmetric workpiece having a first annular weld surface, and a second axisymmetric workpiece having a second annular weld surface, aligning the workpieces on a common axis with the weld surfaces facing each other, rotating one workpiece about the axis relative to the other workpiece, and engaging the workpieces at the first and second weld surfaces such that the rotation raises the temperature at the weld surfaces to create a weld interface, and ceasing the rotation and allowing the weld interface to cool to weld the workpieces together at the interface; wherein:

the first annular weld surface is at a radially inward extent of the first workpiece, and the second annular weld surface is at a radially outward extent of the second workpiece, on a longitudinal section through the aligned workpieces, the first and second annular weld surfaces are inclined from the radial direction and are substantially parallel to each other such that the cooled weld interface is correspondingly inclined from the radial direction, and one of the first and second annular weld surfaces is an apex region of a convexity which is consumed as the workpieces are engaged, on a longitudinal section through the aligned workpieces the convexity having a profile in which radially inner and outer side surfaces of the convexity taper towards the apex region such that, on the longitudinal section, the weld interface increases in length as the convexity is consumed.

Providing a convexity with such a profile can also be used to produce a largely symmetrical heat-sink effect.

In addition, variability in the initial contact conditions at the weld surfaces can be reduced, leading to a more predictable conditioning period. More particularly, local hotspots can be reduced or eliminated and less time may be required to form a plasticised interface zone. In addition, the sideways distance for defects to be rejected into flash can be reduced, and detrimental effects of workpiece diameter mismatch, eccentricity and lack of coaxiality can be reduced or eliminated.

Further, an increased pressure during contact can be achieved, thereby promoting an initial rapid expulsion of interface contaminants and improving sealing of the weld against re-introduction of contaminants.

The convexity can be a projection from the respective workpiece. The other of the first and second annular weld surfaces may be a further apex region of a further convexity, on the longitudinal section the further convexity having a profile in which radially inner and outer side surfaces of the further convexity taper towards the further apex region such that, on the longitudinal section, the weld interface increases in length as the further convexity is consumed. The shapes of the respective convexities can be the same such that, on the longitudinal section through the aligned workpieces, the convexities are related to each other by a 2-fold axis of rotational symmetry about a point located on a line of initial contact of the first and second weld surfaces. Particularly when the workpieces are formed of dissimilar materials, the shapes of their respective convexities can be adjusted accordingly. For example, a workpiece formed of softer material than the other workpiece may have larger side surface angles. In this way, due to the higher rate of upset of the softer workpiece, a better weld interface shape and position can be maintained.

In a third aspect, the present disclosure provides the axisymmetric workpiece of the process of the second aspect having the weld surface which is an apex region of a convexity which is consumed as the workpieces are engaged. For example, an axisymmetric workpiece can be provided for use in a rotary friction welding process, the workpiece having an annular weld surface for engagement, on welding, with a corresponding annular weld surface of a further axisymmetric workpiece such that rotation raises the temperature at the weld surfaces to create a weld interface, wherein: (i) the annular weld surface is at a radially inward or outward extent of the workpiece, (ii) on a longitudinal section through the workpiece, the annular weld surface is inclined from the radial direction, and (iii) the annular weld surface is an apex region of a convexity which is consumed as the workpieces are engaged, on a longitudinal section through the workpiece the convexity having a profile in which radially inner and outer side surfaces of the convexity taper towards the apex region such that, on the longitudinal section, the weld interface increases in length as the convexity is consumed.

Optional features of the disclosure will now be set out. These are applicable singly or in any combination with any aspect of the disclosure.

The process may be an inertia, direct drive, or hybrid rotary friction welding process.

The first and second weld surfaces can be flat surfaces.

On the longitudinal section, the side surfaces may be angled by at least 5°, 10° or 20° from the respective weld surface and/or at most 80°, 70° or 60° from the respective weld surface. If the angle is too low, then the increased contact area during welding can exceed machine capacity and/or reduce the efficiency with which interface contaminants are expelled. In contrast, if the angle is too high, a lack of sideways restraint under upsetting load can force the parts of the workpieces adjacent the weld interface radially inwardly or outwardly. For the or each workpiece, the angle between one of its side surfaces and its weld surface may be greater than the corresponding angle between the other of its side surfaces and its weld surface, for example it may be greater by at least 10°, 20° or 40°. Alternatively, for the or each workpiece, the angle between one of its side surfaces and its weld surface may be the same as the corresponding angle between the other of its side surfaces and its weld surface.

On the longitudinal section, the first and second annular weld surfaces may be inclined by at least 25° or 35° from the radial direction and/or by at most 65° or 55° from the radial direction. Conveniently, they may be inclined by about 45° from the radial direction.

The first and second workpieces may be formed of different materials, e.g. different alloys, or the same material.

Each weld surface and its respective side surfaces may be formed by machining the respective workpiece or by build-up of a suitable material by a material addition process.

Unconsumed portions of the workpieces forming the side surfaces can be removed after welding by machining.

BRIEF DESCRIPTION OF THE DRAWINGS

Embodiments of the disclosure will now be described by way of example with reference to the accompanying drawings in which.

DETAILED DESCRIPTION OF THE DISCLOSURE

Figure 1:
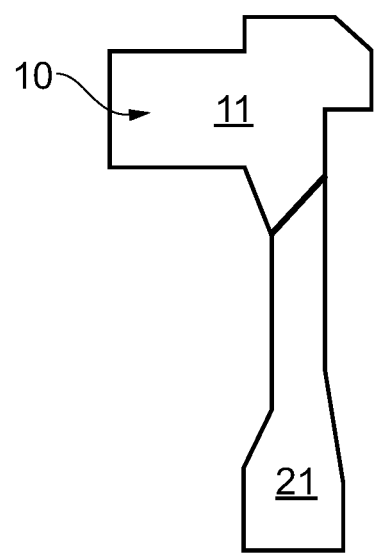
FIG. 1 shows schematically a longitudinal cross-section through a rotor disc formed by rotary friction welding two workpieces.

FIG. 1 shows schematically a longitudinal cross-section through a rotor disc 10 for a gas turbine engine having an engine axis A-A. As discussed below, the disc is formed by rotary friction welding a first axisymmetric workpiece 11 which provides a rim of the disc and a second axisymmetric workpiece 21 which provides a diaphragm of the disc. Advantageously, the first workpiece and hence the rim can be formed of one alloy, while the second workpiece and hence the diaphragm can be formed of another alloy. For example, the alloys can be two types of nickel-chromium-based superalloy, such as RR1000 for the rim and Inco 718 for the diaphragm. In this way a more optimal material utilisation can be achieved.

FIG. 2 shows schematically longitudinal cross-sections through a close-up at the weld surfaces of the workpieces 11, 21 of FIG. 1 to illustrate stages (a)-(e) in a first embodiment of the rotary friction welding process used to form the disc 10.

Figure 2A:
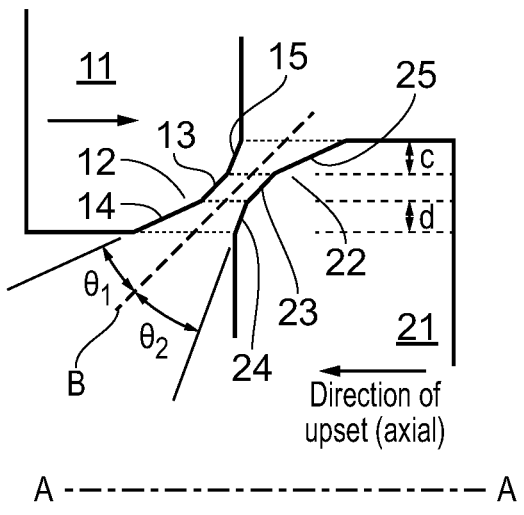
FIG. 2A shows schematically, in respect of a first embodiment of a welding process, a longitudinal cross-section through a close-up at a the weld surfaces of the workpieces of FIG. 1 in readiness to undergo rotary friction welding.

As shown in FIG. 2(a) the first workpiece 11 has a first convexity 12 at a radially inward extent of the workpiece. The apex region of the convexity 12 forms a first annular weld surface 13, with radially inner 14 and outer 15 side surfaces of the convexity 12 tapering towards the apex region. The side surface 14 is angled by an angle $\theta_1$ from the first weld surface 13 and the side surface 15 is angled by an angle $\theta_2$ from the first weld surface 13.

Similarly, the second workpiece 21 has a second convexity 22 at a radially outward extent of the workpiece. The apex region of the convexity 22 forms a second annular weld surface 23, with radially inner 24 and outer 25 side surfaces of the convexity 22 tapering towards the apex region. The side surface 24 is angled by an angle $\theta_2$ from the second weld surface 23 and the side surface 25 is angled by an angle $\theta_1$ from the second weld surface 23.

The convexities 12, 22 can be formed by machining the respective workpiece 11, 21 or by build-up of a suitable material by a material addition process.

The workpieces 11, 21 are aligned on axis A-A with the weld surfaces 13, 23 facing each other. On the longitudinal cross-section, the weld surfaces 13, 23 are both inclined by about 45° from the radial direction. The weld surfaces are flat (or lightly curved or facetted), and are substantially parallel to each other. Inclined surface B midway between the weld surfaces 13, 23 is thus also parallel to both weld surfaces.

The workpieces are configured so that: (i) $\theta_1=\theta_2$, (ii) the radial extents of the side surfaces 14, 15, 24, 25 are all equal (i.e. distance c=distance d), and (iii) the radial extents of the weld surfaces 13, 23 are equal. On the longitudinal cross-section of FIG. 2(a), the convexities 12, 22 are related to each other by a 2-fold axis of rotational symmetry about a point located on the trace of surface B. Such an arrangement with $\theta_1=\theta_2$ may be preferred, for example, in the case of a weld having a small ratio of outer diameter to inner diameter so that weld conditions are similar on both sides of the weld interface.

Figure 2B:
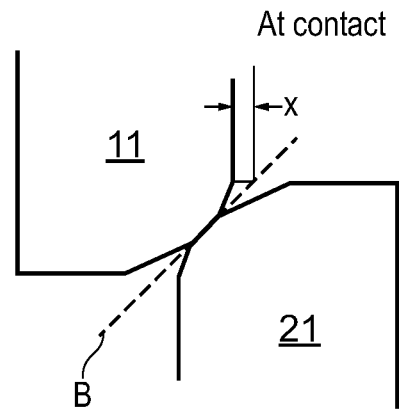
FIG. 2B shows schematically, in respect of the first embodiment of a welding process, a longitudinal cross-section through a close-up at a the weld surfaces of the workpieces of FIG. 1 at contact of the weld surfaces after upset through an axial distance x.

One of the workpieces 11, 21 is rotated about the axis A-A relative to the other workpiece. The two workpieces are then engaged by upsetting through an axial distance x so that the weld surfaces 13, 23 make contact, as shown in FIG. 2(b), and a weld interface is produced which is, initially at least, along the inclined surface B.

Figure 2C:
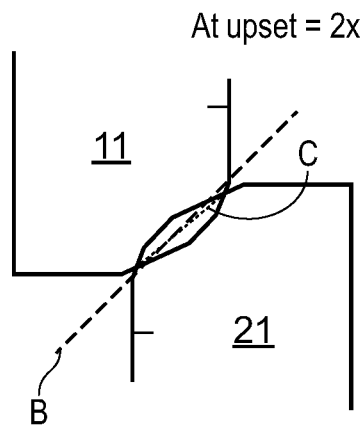
FIG. 2C shows schematically, in respect of the first embodiment of a welding process, a longitudinal cross-section through a close-up at a the weld surfaces of the workpieces of FIG. 1 after upset through an axial distance 2x.

As shown in FIG. 2(c), after upsetting through an axial distance 2x, significant amounts of the convexities 12, 22 are consumed and the weld interface C rotates slightly or becomes slightly "S"-shaped relative to surface B. The weld interface C also increases in length on the longitudinal section as the convexities 12, 22 are consumed. The tapered convexities 12, 22 help to produce a largely symmetrical heat sink to either side of the weld interface C, which reduces bias in the outward flow of expelled material from the weld. In addition, the convexities 12, 22 initially produce localised high pressures and temperatures at the weld interface C, which help to reduce the weld conditioning period.

Figure 2D:
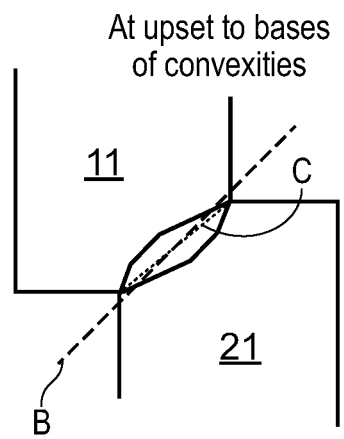
FIG. 2D shows schematically, in respect of the first embodiment of a welding process, a longitudinal cross-section through a close-up at the weld surfaces of the workpieces of FIG. 1 after further upset to the bases of convexities forming the weld surfaces.
Figure 2E:
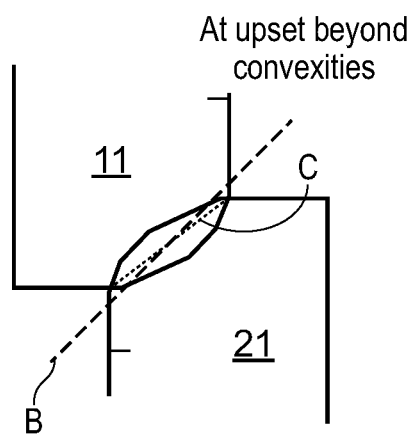
FIG. 2E shows schematically, in respect of the first embodiment of a welding process, a longitudinal cross-section through a close-up at the weld surfaces of the workpieces of FIG. 1 after further upset beyond the convexities.

Referring to FIGS. 2(d) and (e), as the upsetting progresses, the convexities 12, 22 are completely consumed, and there is further slight rotation of the weld interface C, which nonetheless remains inclined from the radial direction.

FIG. 3 shows schematically longitudinal cross-sections through a close-up at the weld surfaces of the workpieces 11, 21 of FIG. 1 to illustrate stages (a)-(d) in a second embodiment of the rotary friction welding process. Features in FIG. 3 corresponding to those in FIG. 2 have the same reference numbers.

The process is similar to that of the first embodiment except that the convexities 12, 22 are now in the form of projections from the workpieces 11, 21. This change in form of the convexities is brought about by substantially increasing the angle $\theta_1$ by which side surface 15 is angled from the first weld surface 13, and the corresponding angle $\theta_1$ by which side surface 24 is angled from the second weld surface 23. Angles $\theta_2$ for the other side surfaces 14, 25 are unchanged. On the longitudinal cross-section of FIG. 3(a), the convexities 12, 22 are still related to each other by a 2-fold axis of rotational symmetry located on the trace of surface B.

Figure 3A:
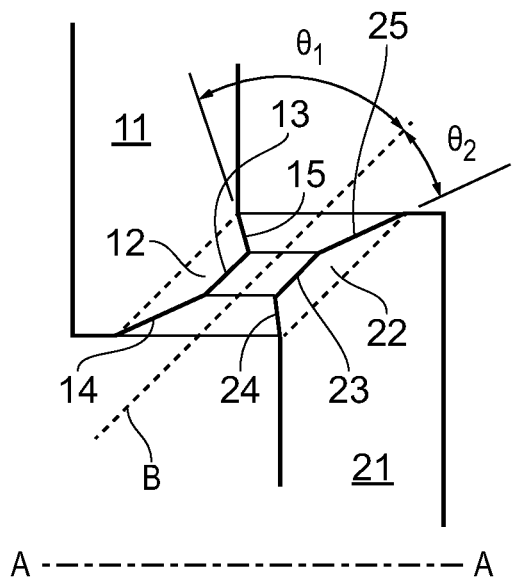
FIG. 3A shows schematically, in respect of a second embodiment of a welding process, a longitudinal cross-section through a close-up at the weld surfaces of the workpieces of FIG. 1 in readiness to undergo rotary friction welding.
Figure 3B:
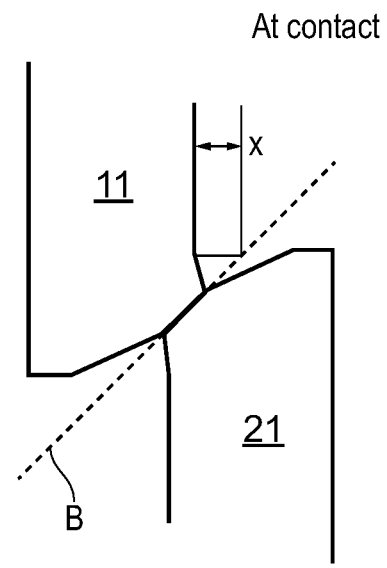
FIG. 3B shows schematically, in respect of the second embodiment of a welding process, a longitudinal cross-section through a close-up at the weld surfaces of the workpieces of FIG. 1 at contact of the weld surfaces after upset through an axial distance x.
Figure 3C:
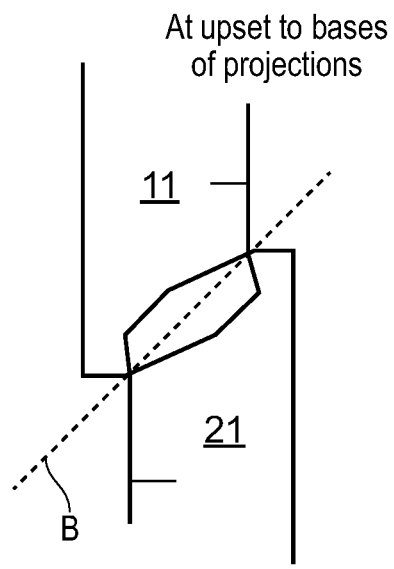
FIG. 3C shows schematically, in respect of the second embodiment of a welding process, a longitudinal cross-section through a close-up at the weld surfaces of the workpieces of FIG. 1 after upset to the bases of projections forming the weld surfaces.
Figure 3D:
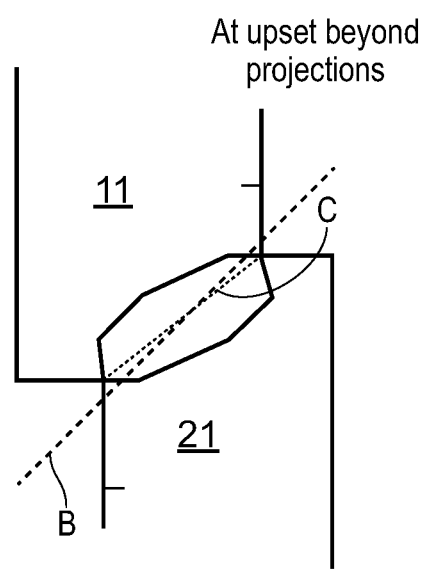
FIG. 3D shows schematically, in respect of the second embodiment of a welding process, a longitudinal cross-section through a close-up at the weld surfaces of the workpieces of FIG. 1 after further upset beyond the projections.

The asymmetric angles $\theta_1$, $\theta_2$ produce an asymmetric heat sink in the respective workpieces 11, 21 which allows the weld interface C to remain substantially unrotated, i.e. parallel to surface B, during the consumption of the projections 12, 22. With reference to FIG. 3(d), as upsetting continues past the bases of the projections 12, 22, however, the weld interface C may slightly rotate or become slightly "S"-shaped.

The asymmetric volumes at the bases of the projections 12, 22 can influence local softening and therefore efficiency of flash flow and expulsion of contaminants in the latter stages of the consumption of the projections. This issue can be addressed in a third embodiment of the rotary friction welding process. FIG. 4 shows schematically longitudinal cross-sections through a close-up at the weld surfaces of the workpieces 11, 21 of FIG. 1 to illustrate stages (a)-(e) in the third embodiment. Features in FIG. 4 corresponding to those in FIGS. 2 and 3 have the same reference numbers.

In the third embodiment, the workpieces 11, 21 are adjusted so that the internal workpiece angles $\theta_3$, $\theta_4$, $\theta_5$, $\theta_6$ between the side surfaces 14, 15, 24, 25 and the workpiece surfaces neighbouring the projections are all the same, i.e. $\theta_3=\theta_4=\theta_5=\theta_6$. In contrast, in FIG. 3(a), the corresponding angles to $\theta_3$ and $\theta_5$ are significantly less than the corresponding angles to $\theta_4$ and $\theta_6$. The adjustment can be achieved by providing additional workpiece surfaces 16, 26 adjacent to side surfaces 15, 25. On the longitudinal cross-section of FIG. 4(a), the convexities 12, 22 are still related to each other by a 2-fold axis of rotational symmetry located on the trace of surface B.

Figure 4A:
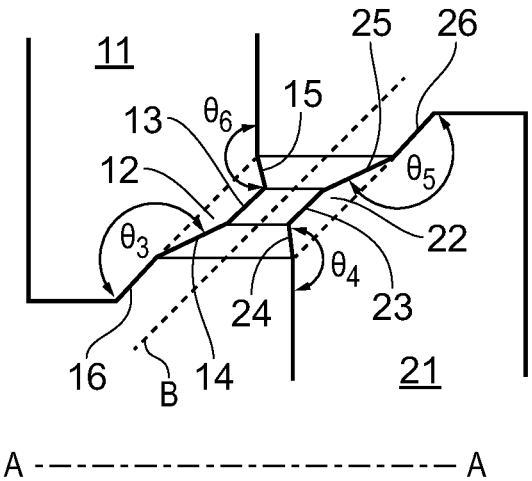
FIG. 4A shows schematically, in respect of a third embodiment of the welding process, a longitudinal cross-section through a close-up at the weld surfaces of the workpieces of FIG. 1 in readiness to undergo rotary friction welding.
Figure 4B:
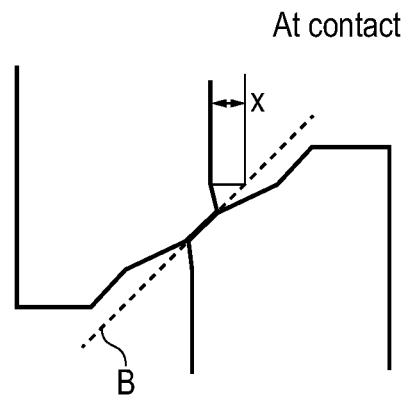
FIG. 4B shows schematically, in respect of the third embodiment of the welding process, a longitudinal cross-section through a close-up at the weld surfaces of the workpieces of FIG. 1 at contact of the weld surfaces after upset through an axial distance x.
Figure 4C:
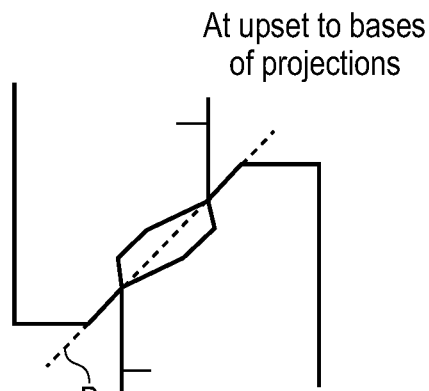
FIG. 4C shows schematically, in respect of the third embodiment of the welding process, a longitudinal cross-section through a close-up at the weld surfaces of the workpieces of FIG. 1 after further upset to the bases of projections forming the weld surfaces.
Figure 4D:
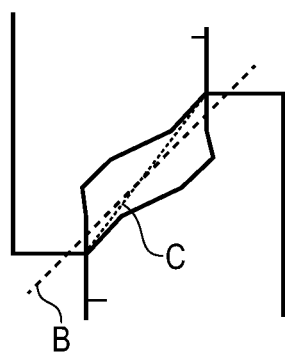
FIG. 4D shows schematically, in respect of the third embodiment of the welding process, a longitudinal cross-section through a close-up at the weld surfaces of the workpieces of FIG. 1 after further upset to the edges of adjacent additional surfaces.
Figure 4E:
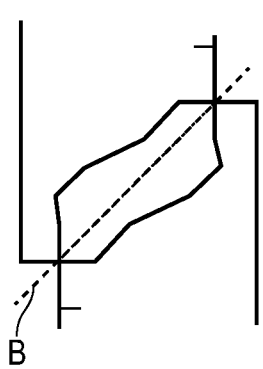
FIG. 4E shows schematically, in respect of the third embodiment of the welding process, a longitudinal cross-section through a close-up at the weld surfaces of the workpieces of FIG. 1 after further upset beyond the adjacent additional surfaces.

The adjustment that produces $\theta_3=\theta_4=\theta_5=\theta_6$ helps to promote an equal heat flow at all sides of the weld interface as the upset reaches the base of the projections (FIG. 4(c)). In this way, flash flow and expulsion of contaminants in the latter stages of the consumption of the projections can still be balanced to both sides of the weld.

In the case of a weld having a large ratio of outer diameter to inner diameter, the difference in relative velocity of the workpieces between the outer and inner diameters can prompt an adjustment of the angles such that $\theta_3=\theta_4\neq\theta_5=\theta_6$ (with $\theta_3$ and $\theta_4$ typically being greater than $\theta_5$ and $\theta_6$) in order to ensure unbiased expulsion. Similarly, $\theta_4$ and $\theta_5$ can be adjusted relative to $\theta_3$ and $\theta_6$ to account for differences in material thermal and mechanical properties when welding dissimilar materials.

In general, to control weld interface rotation, the welding process can be stopped at or shortly after complete consumption of the convexities, i.e. at stage (d) in FIG. 2, stage (c) in FIG. 3 and stage (c) in FIG. 4.

Figure 5:
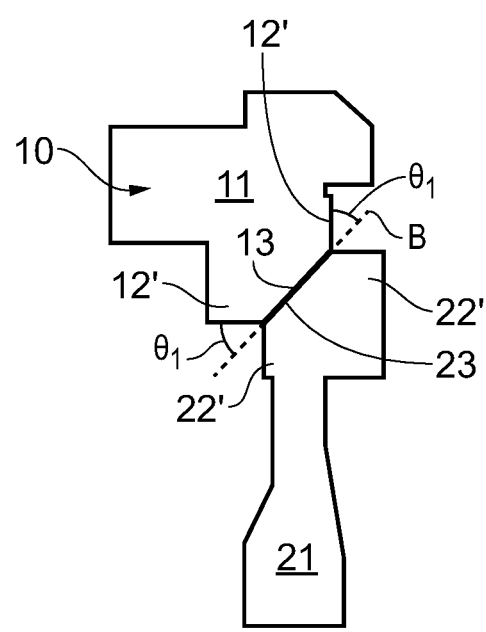
FIG. 5 shows schematically a longitudinal cross-section through aligned workpieces at initial weld surface contact in a fourth embodiment of the welding process.

FIG. 5 shows schematically a longitudinal cross-section through the aligned workpieces 11, 21 of FIG. 1 at initial weld surface contact in a fourth embodiment of the rotary friction welding process for forming the disc 10. In this case, the weld surfaces 13, 23 and their respective angled side surfaces mirror each other across the line B of the contacting weld surfaces on the longitudinal cross-section. Such an arrangement may be preferred, for example, when the workpieces are formed of the same material such that flash flow and expulsion of contaminants is largely the same at both workpieces, and/or when the weld surfaces are inclined by 45° from the radial direction.

In the fourth embodiment, each workpiece has the angle $\theta_1$ between one of its side surfaces and its weld surface being the same as the corresponding angle between the other of its side surfaces and its weld surface. Such an arrangement may be preferred, for example, in the case of a weld having a small ratio of outer diameter to inner diameter so that weld conditions are similar on both sides of the weld interface.

Those parts of the workpieces forming the side surfaces may be provided by portions of the workpieces which are not consumed by the welding process. For example, in the fourth embodiment the side portions 12' of the first weld surface 13 and the side portions 22' of the second weld surface 23 are not consumed. Conveniently, in this case, the side portions 12', 22' can be formed by build-up of a suitable material in a material addition process, and can be removed post-welding by machining.

Figure 6:
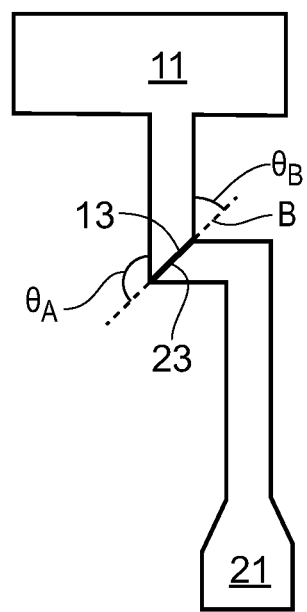
FIG. 6 shows schematically a longitudinal cross-section through aligned workpieces at initial weld surface contact in a fifth embodiment of the welding process.

FIG. 6 shows schematically a longitudinal cross-section through aligned workpieces 11, 21 at initial weld surface contact in a fifth embodiment of the rotary friction welding process for forming a disc. Like the fourth embodiment, the weld surfaces 13, 23 and their respective side surfaces mirror each other across the line B of the contacting weld surfaces on the longitudinal cross-section. However, in the fifth embodiment, each workpiece has the angle $\theta_A$ between one of its side surfaces and its weld surface and being different to the corresponding angle $\theta_B$ between the other of its side surfaces and its weld surface. Further, the weld surfaces and their side surfaces are not formed by convexities. Nonetheless, the mirroring across the line B of contact can help to promote a similar heat-sink effect in each workpiece.

In the fourth and fifth embodiments, deviation from exacting mirroring across the line B of the contacting weld surfaces on the longitudinal cross-section may be adopted in order to thermally match the weld surfaces and their side surfaces such the heat flows from the weld at all the side surfaces are substantially equal. Such deviation may be beneficial, for example, when the materials of the workpieces have different thermal properties and/or when the weld surfaces are inclined by angles other than 45° from the radial direction.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

We claim:
1. A rotary friction welding process including:
   providing a first axisymmetric workpiece having a first annular weld surface, and a second axisymmetric workpiece having a second annular weld surface,
   aligning the workpieces on a common axis (A-A) with the weld surfaces facing each other, rotating one workpiece about the axis relative to the other workpiece, and engaging the workpieces at the first and second weld surfaces such that the rotation raises the temperature at the weld surfaces to create a weld interface (C), and
   ceasing the rotation and allowing the weld interface to cool to weld the workpieces together at the interface;
   wherein:
   the first annular weld surface is at a radially inward extent of the first workpiece, and the second annular weld surface is at a radially outward extent of the second workpiece,
   on a longitudinal section through the aligned workpieces, the first and second annular weld surfaces are inclined from the radial direction and are substantially parallel to each other such that the cooled weld interface is correspondingly inclined from the radial direction, and
   on the longitudinal section through the aligned workpieces, each of the first and second annular weld surfaces is flanked by radially inner and outer side surfaces which are angled from their respective weld surface, the first weld surface and its side surfaces being shaped to thermally match the second weld surface and its side surfaces across a line of initial contact of the first and second weld surfaces such the heat flows from the weld at all the side surfaces are substantially equal.

2. A rotary friction welding process according to claim 1, wherein on the longitudinal section through the aligned workpieces, the first weld surface and its side surfaces mirror the second weld surface and its side surfaces across the line of initial contact of the first and second weld surfaces.

3. A rotary friction welding process according to claim 1, wherein each of the first and second annular weld surfaces is an apex region of a convexity which is consumed as the workpieces are engaged, on the longitudinal section through the aligned workpieces each convexity having a profile in which the radially inner and outer side surfaces taper towards the apex region such that, on the longitudinal section, the weld interface increases in length as the convexities are consumed.

4. A rotary friction welding process according to claim 3, wherein the, or each, convexity is a projection from the respective workpiece.

5. A rotary friction welding process according to claim 1, wherein the first and second weld surfaces are flat surfaces.

6. A rotary friction welding process according to claim 1, wherein, on the longitudinal section, the side surfaces are angled by at least 5° and/or at most 80° from the respective weld surface.

7. A rotary friction welding process according to claim 1, wherein, for the or each workpiece, the angle between one of its side surfaces and its weld surface is greater than the corresponding angle between the other of its side surfaces and its weld surface.

8. A rotary friction welding process according to claim 1, wherein, for the or each workpiece, the angle between one of its side surfaces and its weld surface is the same as the corresponding angle between the other of its side surfaces and its weld surface.

9. A rotary friction welding process according to claim 1, wherein, on the longitudinal section, the first and second annular weld surfaces are inclined by at least 25° and/or by at most 65° from the radial direction.

10. A rotary friction welding process according to claim 1, wherein the first and second workpieces are formed of different materials.

11. A rotary friction welding process according to claim 1, wherein the welded workpieces form a turbine machinery rotor disc, the first workpiece providing a rim of the disc and the second workpiece providing a diaphragm of the disc.

12. A rotary friction welding process including:
    providing a first axisymmetric workpiece having a first annular weld surface, and a second axisymmetric workpiece having a second annular weld surface,
    aligning the workpieces on a common axis (A-A) with the weld surfaces facing each other, rotating one workpiece about the axis relative to the other workpiece, and engaging the workpieces at the first and second weld surfaces such that the rotation raises the temperature at the weld surfaces to create a weld interface (C), and
    ceasing the rotation and allowing the weld interface to cool to weld the workpieces together at the interface;
    wherein:
    the first annular weld surface is at a radially inward extent of the first workpiece, and the second annular weld surface is at a radially outward extent of the second workpiece,
    on a longitudinal section through the aligned workpieces, the first and second annular weld surfaces are inclined from the radial direction and are substantially parallel to each other such that the cooled weld interface is correspondingly inclined from the radial direction,
    one of the first and second annular weld surfaces is an apex region of a convexity which is consumed as the workpieces are engaged, on a longitudinal section through the aligned workpieces the convexity having a profile in which radially inner and outer side surfaces of the convexity taper towards the apex region such that, on the longitudinal section, the weld interface increases in length as the convexity is consumed.

13. A rotary friction welding process according to claim 12, wherein the, or each, convexity is a projection from the respective workpiece.

14. A rotary friction welding process according to claim 12, wherein the other of the first and second annular weld surfaces is a further apex region of a further convexity, on the longitudinal section the further convexity having a profile in which radially inner and outer side surfaces of the further convexity taper towards the further apex region such that, on the longitudinal section, the weld interface increases in length as the further convexity is consumed.

15. A rotary friction welding process according to claim 14, wherein the shapes of the respective convexities are the same such that, on the longitudinal section through the aligned workpieces, the convexities are related to each other by a 2-fold axis of rotational symmetry about a point located on a line of initial contact of the first and second weld surfaces.

* * * * *